(12) United States Patent
Hedtke

(10) Patent No.: US 7,509,220 B2
(45) Date of Patent: Mar. 24, 2009

(54) INCLINATION MEASUREMENT IN PROCESS TRANSMITTERS

(75) Inventor: Robert Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 256 days.

(21) Appl. No.: 11/505,017

(22) Filed: Aug. 16, 2006

(65) Prior Publication Data

US 2008/0042863 A1    Feb. 21, 2008

(51) Int. Cl.
G01C 19/54    (2006.01)
G01C 25/00    (2006.01)
G01C 9/00    (2006.01)

(52) U.S. Cl. ...................................... 702/104; 702/150
(58) Field of Classification Search ................... 702/104
See application file for complete search history.

(56) References Cited

U.S. PATENT DOCUMENTS

| | | | |
|---|---|---|---|
| 4,390,321 A | 6/1983 | Langlois et al. | |
| RE35,269 E | 6/1996 | Comerford | |
| 5,828,567 A | 10/1998 | Eryurek et al. | |
| 5,952,803 A | 9/1999 | Canada et al. | |
| 5,956,663 A | 9/1999 | Eryurek | |
| 6,601,005 B1 * | 7/2003 | Eryurek et al. | 702/104 |
| 6,694,997 B2 | 2/2004 | Reyman | |
| 6,771,440 B2 | 8/2004 | Smith | |
| 6,854,028 B2 | 2/2005 | Smith | |
| 2004/0024568 A1 * | 2/2004 | Eryurek et al. | 702/182 |
| 2004/0040707 A1 * | 3/2004 | Dusterhoft et al. | 166/279 |
| 2005/0072239 A1 * | 4/2005 | Longsdorf et al. | 73/649 |
| 2007/0040660 A1 * | 2/2007 | Miller et al. | 340/442 |
| 2007/0150226 A1 * | 6/2007 | Graf | 702/150 |
| 2008/0024319 A1 * | 1/2008 | Close | 340/854.3 |
| 2008/0048405 A1 * | 2/2008 | DeLorenzis et al. | 280/6.159 |

* cited by examiner

*Primary Examiner*—Michael P. Nghiem
*Assistant Examiner*—Cindy H Khuu
(74) *Attorney, Agent, or Firm*—Kinney & Lange, P.A.

(57) ABSTRACT

A process control system includes a process sensor, an inclination sensor and transmitter circuitry. The process sensor senses the process variable of a process fluid and the inclination sensor senses the orientation of the transmitter. The transmitter circuitry produces an output based on the sensed process variable and the sensed orientation.

29 Claims, 5 Drawing Sheets

INCLINATION MEASUREMENT IN PROCESS TRANSMITTERS

BACKGROUND OF THE INVENTION

This invention relates generally to process instruments used in industrial process control systems. More particularly, the present invention relates to process transmitters having inclination measurement sensors.

Process transmitters are used to remotely monitor a process variable, such as pressure, temperature or flow, of a process fluid, such as a petrochemical or water. A process transmitter typically includes a sensor or transducer that produces an electrical signal in response to physical changes in a process variable. For example, capacitive pressure transducers or piezoresistive pressure transducers produce an electrical signal as a function of the pressure of a process fluid. The sensor signal is processed by transmitter circuitry to produce an output signal that can be monitored as an indication of a process variable of the process fluid. The output signal can be monitored remotely at a control room such as through a control loop or network, or can be monitored locally such as with an LCD screen.

In order to couple the circuitry and the sensor with the process fluid, the components are contained in a housing that can be mounted to a process fluid vessel, such as a storage tank or pipeline, with process connections such as flanges, manifolds, diaphragms or other coupling devices. Various combinations of process connections allow the transmitters to be mounted in a variety of orientations for different applications, to overcome physical barriers and for customer preferences.

In pressure transmitters, for example, a pressure sensor is mechanically coupled with the process fluid through a mounting flange comprising a flexible diaphragm that isolates the sensor of the pressure transmitter from the process fluid. The diaphragm is linked with the pressure sensor through passageways that are filled with a substantially incompressible fill fluid. As the process fluid presses against the diaphragm, the fill fluid conveys the pressure to the pressure sensor, wherein the pressure reading is determined. The fill fluid itself also exerts a force on the pressure sensor due to its own weight, for which the transmitter must be calibrated. Changing the orientation of the transmitter can affect the amount of this force due to what is known as head effect. Typically, for lower pressure applications, an operator is required to perform a recalibration after the transmitter has been installed in a new orientation to reset the zero pressure reference orientation.

Additionally, after reorienting a transmitter, such as for a new application or a changed process vessel, the process transmitter may be positioned in such a manner that the LCD display is awkwardly positioned, therefore making it difficult for a user to read the display. In order to reconfigure the LCD display it must be removed from the transmitter housing and reinstalled, typically in 90-degree increments. As such, it would be desirable to eliminate or otherwise reduce inconveniences related to reorienting process transmitters.

BRIEF SUMMARY OF THE INVENTION

The present invention is directed toward a process transmitter for measuring a process variable wherein the process transmitter comprises a sensor, transmitter circuitry and an inclination sensor. The process sensor senses the process variable of a process fluid and the inclination sensor senses the orientation of the transmitter. The transmitter circuitry produces an output based on the sensed process variable and the sensed orientation.

DETAILED DESCRIPTION

Figure 1A:
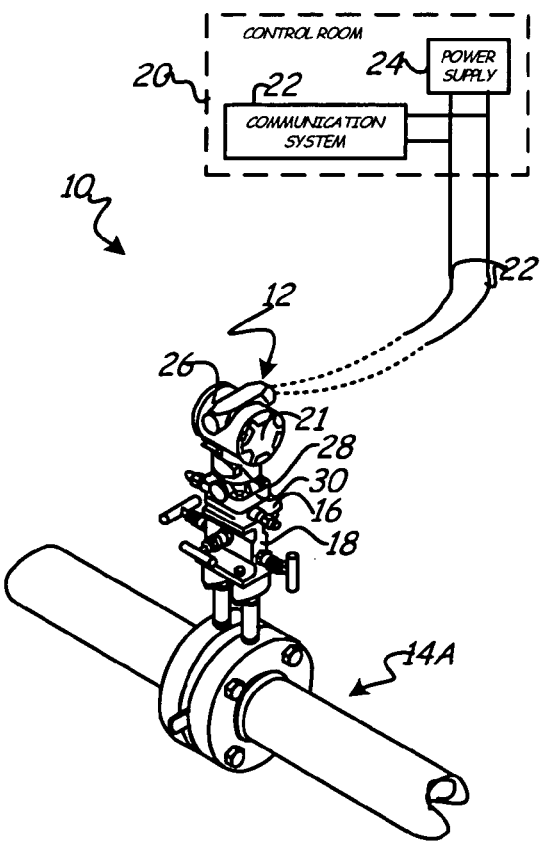
FIG. 1A shows a process control system in which the process transmitter of the present invention is used.

FIG. 1A shows one embodiment of process control system 10 in which process transmitter 12 is mounted with pipeline 14A in a gas-flow configuration. Process transmitter 12 is mated with pipeline 14A through COPLANAR™ process flange 16 and manifold 18 such that it is in fluid communication with a process fluid, such as a gas, in pipeline 14A. Process transmitter 12 includes a sensor and circuitry for monitoring a process variable of the process fluid in pipeline 14A. The circuitry generates an output based on the sensed variable of the process fluid and transmits the output to control room 20, a local display, such as LCD 21 or both. The circuitry also conditions and processes the output such that it accurately conveys the magnitude of the sensed variable. Particularly, the circuitry includes an inclination sensor for adjusting the sensor signal.

Process transmitter 12 is connected with control loop 22 such that the output associated with the process variable can be transmitted to, and remotely monitored at control room 20, which includes communication system 22 and power supply 24. In one embodiment, process transmitter 12 is a two-wire transmitter for operating on a 4-20 mA control loop. In such an embodiment, control loop 22 includes a pair of wires for supplying power to process transmitter 12 from power supply 24. Typically, a 4 mA DC current provides sufficient energy for operating the sensor and transmitter circuitry of process transmitter 12 and LCD 21. Control loop 22 also permits process transmitter 12 to communicate with communication system 22, which receives and sends data to transmitter 12.

The advantages of the present invention are particularly beneficial for use in process transmitters configured for sensing pressure, and, except where indicated, the invention is hereinafter described with respect to transmitter 12 being configured as a pressure transmitter. However, in other embodiments, transmitter 12 can be configured for sensing other process variables, such as fluid level or temperature. Transmitter 12 includes transmitter housing 26, which contains the transmitter electronics; sensor housing 28, which contains the pressure sensor; and mounting flange 30, which provides flexible diaphragms for hydraulically interacting with the process fluid. Sensor housing 28 and mounting flange 30 together form a hydraulic passageway through which a fill fluid conveys the pressure of the process fluid from the diaphragms to the pressure sensor. Transmitter 12 is mounted on pipeline 14A in a gas-flow configuration such that COPLANAR™ flange 16 and mounting flange 30 have a generally horizontal orientation. The circuitry must be calibrated for the particular head effect influence of the fill fluids on the sensor due to the orientation of the hydraulic passageway. In the orientation shown in FIG. 1A, the head effect is approximately zero and is negligible. Also, LCD 21 must be configured for the orientation in which transmitter 12 is mounted on pipeline 14.

Figure 1B:
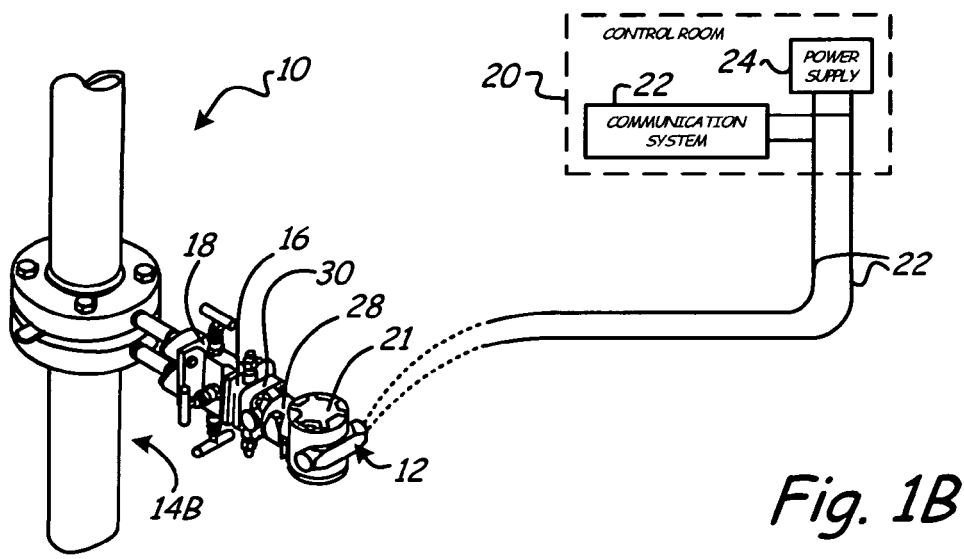
FIG. 1B shows the process transmitter of FIG. 1A mounted with a process control system in a second configuration.

However, process transmitter 12 can be mounted in a myriad of orientations, each requiring a unique head effect calibration and an optimal LCD configuration. For example, the same transmitter used for gas-flow operations can also be used in liquid-flow operations, sometimes requiring different hardware and mounting orientations. FIG. 1B shows another embodiment of process control system 10 in which process transmitter 12 is mounted with vertical pipeline 14B in a gas-flow configuration such that COPLANAR™ flange 16 and mounting flange 30 have a generally vertical orientation. In the orientation shown in FIG. 1B, the head effect is at its maximum. As such, transmitter 12 includes an inclination sensor for determining the orientation of process transmitter 12, which can be used to automatically calibrate the circuitry and configure LCD 21.

Figure 2:
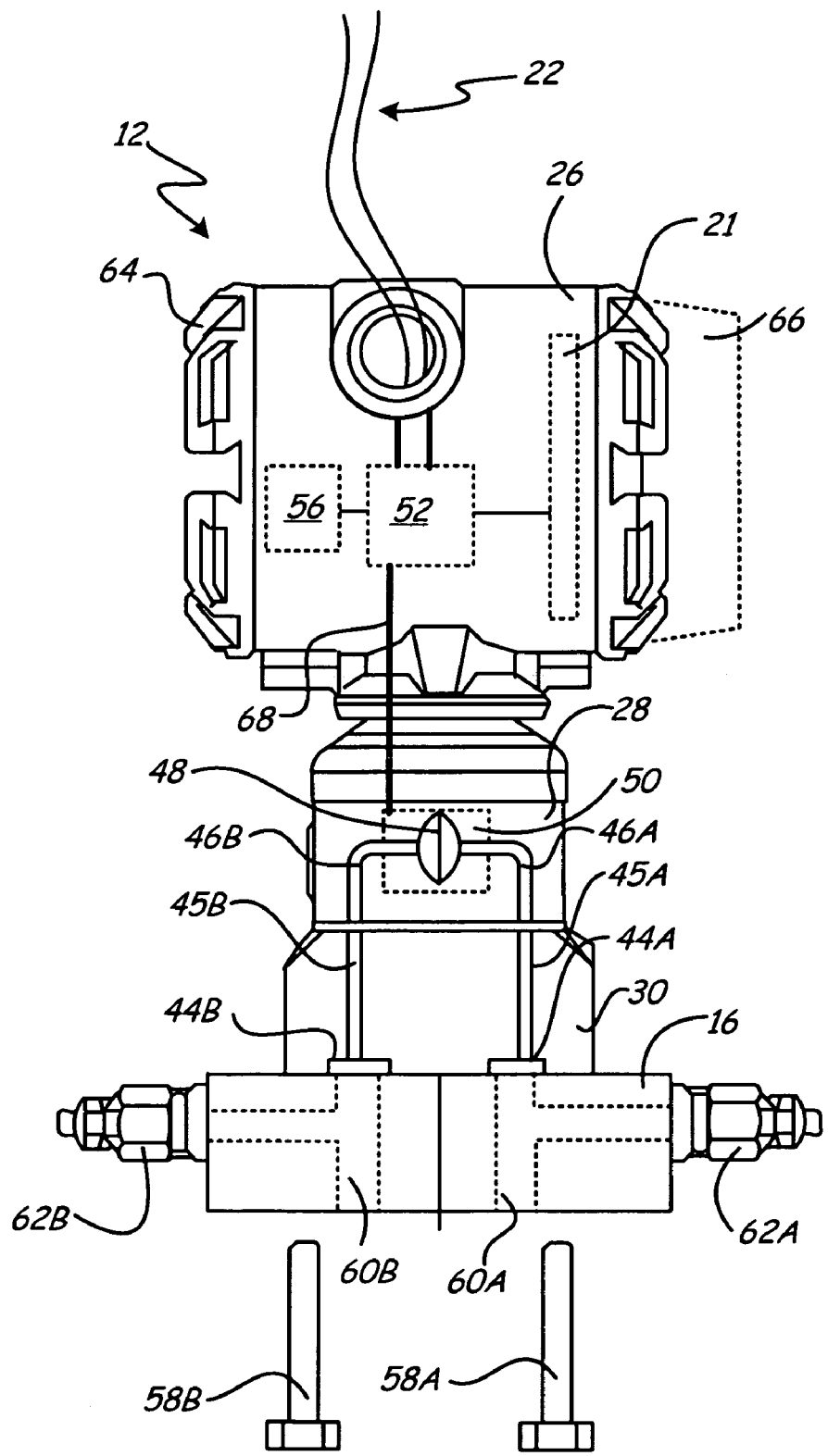
FIG. 2 is a schematic side view of the pressure transmitter of FIGS. 1A and 1B including a inclination detection device.

FIG. 2 is a schematic side view of process transmitter 12 of FIGS. 1A and 1B configured for differential pressure measurement. Process transmitter 12 comprises transmitter housing 26, sensor housing 28 and mounting flange 30, which is coupled with COPLANAR™ process flange 16. Process transmitter 12 includes mechanical and electrical systems for sensing, conditioning, displaying and transmitting the pressure of a process fluid. Transmitter 12 is configured for differential pressure measurement, in which two different pressures of the process fluid, such as on either side of an orifice plate, are relayed to sensor 50. Transmitter 12 comprises a pair of parallel mechanical hydraulic systems for relaying pressures of the process fluid to sensor 50, including process diaphragms 44A and 44B, lower passageways 45A and 45B, upper passageways 46A and 46B, and sensor diaphragm 48. In other embodiments, transmitter 12 is configured for gage pressure measurements in which a single hydraulic system is used. Transmitter 12 also includes an electrical system for processing the signals from sensor 50 and relaying an output to control room 20 and LCD 21, including transmitter circuitry 52 and inclination detection device 56.

In one embodiment, fasteners 58A and 58B are used to mount process flange 16 between manifold 18 (FIG. 1) and mounting flange 30. Process flange 16 includes process fluid channels 60A and 60B and drain/vent valves 62A and 62B. Process fluid enters channels 60A and 60B from manifold 18, which receives the process fluid from pipeline 14. Drain/vent valves 62A and 62B provide access to the process fluid without disruption of process control system 10 so various diagnostic or maintenance functions can be performed. Fasteners 58A and 58B are inserted into bores (not shown) in process flange 16 and into mounting flange 30 such that channels 60A and 60B are aligned with process diaphragms 44A and 44B of mounting flange 30. The process fluid inside channels 60A and 60B exerts a force on process diaphragms 44A and 44B, which are in communication with sensor 50 through upper passageways 45A and 45B of sensor housing 28, and lower passageways 46A and 46B of flange 30.

Sensor housing 28 and mounting flange 30 are typically cast and machined as a unitary piece, with sensor housing 28 primarily comprising a hollowed out cavity for holding sensor 50. Sensor housing 28 and flange 30 together provide a framework that permits diaphragms 44A and 44B to communicate with sensor 50, and provide a means for mounting transmitter 12 with process control system 10. Lower passageways 45A and 45B typically comprise narrow channels machined into mounting flange 30. Upper passageways 46A and 46B typically comprise segments of stainless steel tubing welded to flange 30 at the opening of lower passageways 45A and 45B. In series, the upper and lower passageways extend from the bottom surface of flange 30 through to sensor diaphragm 48, and provide a sealed channel that extends the reach of sensor 50. Passageways 45A and 45B are sealed at lower ends by diaphragms 44A and 44B, respectively, and are joined at upper ends with lower ends of passageways 46A and 46B. Upper ends of passageways 46A and 46B are then sealed with sensor diaphragm 48. Passageways 45A and 45B, and 46A and 46B are filled with a fill fluid, such as silicone oil, or any other fluid that is substantially incompressible, and may contain other additives. Thus, diaphragms 44A and 44B are hydraulically connected with diaphragm 48 of sensor 50.

Sensor 50 is, for example, a capacitance-based pressure cell, in which the capacitance of pressure sensor 50 changes as a function of position of diaphragm 48. The position of diaphragm 48 changes as the pressure in the process fluid changes, as presented through the fill fluids. Sensor diaphragm 48 provides a flexible barrier between passageways 46A and 46B that deflects in response to a change in the pressure difference between channels 60A and 60B (e.g. the pressure difference across the orifice plate). Thus, the change in capacitance of sensor 50 is used to determine the change in pressure of the process fluid in pipeline 14. In other embodiments, sensor 50 operates on other known sensing principles, such as with piezoresistive strain gauge technology. Sensor 50 produces an electrical signal based on the sensed pressure of the process fluid, which is received and monitored by transmitter circuitry 52 located in transmitter housing 26.

In one embodiment, transmitter housing 26 is typically threaded onto sensor housing 28, and provides a structure for locating transmitter circuitry 52 and other electronic components of transmitter 12 such as LCD 21. Transmitter housing 26 is threaded onto housing 28 and can be rotated to any desirable position. Transmitter housing 26 includes covers 64 and 66, which are used to access components of transmitter 12 such as terminals for control loop 22, LCD 21 or circuitry 52. For embodiments of transmitter 12 including LCD 21, cover 66 may include extra space for LCD 21 and include a visor (shown in phantom) for screening LCD 21.

Transmitter circuitry 52 receives signals from sensor 50 through a hard connection, such as wires 68. Transmitter circuitry 52 transmits a transmitter output representative of the process variable (e.g. differential pressure) sensed by sensor 50 to control room 20 and/or LCD 21. Although the invention has been described using a 4-20 mA control loop, any type of control loop can be used. The output of transmitter circuitry 52 may be analog, digital, or a combination of both. In other embodiments, transmitter circuitry 52 communicates over a wireless network. In still other embodiments, process transmitter 12 is not connected with control room 12 and output of circuitry 52 is readable by a wireless or wire-connected handheld device. Before transmitting the transmitter output based on the sensor signal, however, circuitry 52 performs various operations on the sensor signal. For example, transmitter 52 conditions the signal into a usable format and typically performs temperature compensation and filtering operations. Additionally, circuitry 52 compensates the sensor signal for changes in the head effect influence of the fill fluid by utilizing a signal generated by inclination sensor 56.

Due to the head effect, the signal of sensor 50 is affected by a change in the orientation of transmitter 12. Circuitry 52 is calibrated to read the capacitance of sensor 50 based on known, precise amounts of fill fluid present in the hydraulic systems of passageways 45A, 45B, 46A and 46B. Circuitry 52 is also programmed to take into account the effect that the weight of the fill fluid has on diaphragm 48, i.e. the head effect. In the configuration of FIG. 1A, process transmitter 12 is in a generally upright position such that the fill fluid present in each passageway exerts an approximately equal amount of force on sensor diaphragm 48. In other words, the head effect from each side is approximately zero because gravity is acting equally on passageways 45A-46A and 45B-46B. If the orientation of process transmitter 12 changes, such as to the configuration shown in FIG. 1B, the amount of pressure exerted on sensor diaphragm 48 by the fill fluids present in passageways 45A-46B also changes, i.e. the head effect would not equal zero.

Head effect is especially problematic in transmitters intended for measuring small pressure changes, such as in draft range transmitters used in chimneys. For example, some transmitters sense pressure in the range of approximately 0 to 1 inches of water absolute, or 0 to 5 inches of water differential. The amount of fill fluid in passageways 45A and 46A, for illustrative purposes, is approximately equal to one inch of water. Thus, a change in the head effect from the fill fluid in passageways 45A-46B can produce significant errors in the output of transmitters, especially those used in draft range applications. Therefore, the sensor signal transmitted across wires 68 to circuitry 52 is affected by changes in head effect, and the transmitter output to control room 22 or LCD 21 needs to be duly compensated such that the actual pressure level is indicated. Previous process transmitters have required recalibration after each installation in order to compensate for head effects, thus requiring physically venting the device in the field and performing a calibration procedure, which takes time and presents the possibilities of producing operator errors. Transmitter 12, however, is configured with inclination sensor 56 in order to detect a change in the orientation of transmitter 12 such that circuitry 52 can be accordingly calibrated automatically.

Inclination sensor 56 comprises an accelerometer or any other similar device for determining a change in the orientation of transmitter 12 and can be positioned anywhere in the device. Any suitable accelerometer technology can be used, such as piezoelectric, capacitive or electrodynamic. Specifically, in one embodiment, inclination sensor 56 is a three-in-one sensor such as the one described in U.S. Pat. No. 6,722, 199 by Ploechinger. In another embodiment, inclination sensor 56 is an integrated micro electrical mechanical system accelerometer such as the ADXL330 accelerometer or another similar device as is available from Analog Devices, Inc. Norwood, Mass., U.S.A. In another embodiment, inclination sensor 56 is a ML8950 tri-axis accelerometer available from Oki Electric Industry Co., Tokyo, Japan. Preferably, inclination sensor 56 is a three-axis accelerometer, in which case it generates a signal including an acceleration vector for each of the three axes, which are then compared to a transmitter reference orientation.

Figures 3A, 3B, 3C:
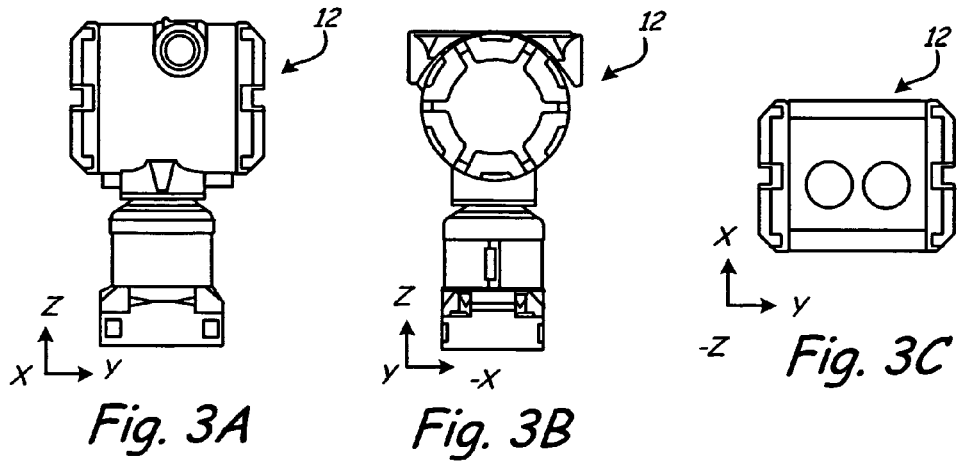
FIG. 3A shows the process transmitter of FIG. 2 having an upright reference orientation.
FIGS. 3B-3G show the transmitter of FIG. 3A rotated at various orientations from the reference orientation.

FIGS. 3A-3F show process transmitter 12 in various orientations. For illustrative purposes, FIGS. 3A-3F include a local origin that illustrates the change in orientation for each view of transmitter 12. FIG. 3A shows process transmitter 12 having an orientation corresponding to one possible reference orientation. Transmitter circuitry 52 is provided with a reference orientation from which inclination sensor 56 can sense a change in the inclination or orientation of transmitter 12. The reference point gives circuitry 52 a basis for determining how gravity affects the head effect. Any starting orientation can be used for the reference point, with which circuitry 52 is typically programmed at the factory. The reference point can be a three-dimensional coordinate system, but any reference system can be used. In other embodiments, circuitry 52 is provided with a manually operated calibration system reset, such that the reference orientation and head effect calibration can be reset for any starting orientation. In FIG. 3A, transmitter 12 is "upright" with respect to the z-axis, which corresponds to the direction of gravity.

The reference point relates the orientation of transmitter 12 to earth's horizon, which is related to the direction of gravity. For the orientation of FIG. 3A, earth's horizon is the x-y plane, and the direction of gravity corresponds to the z-axis. The head effect on diaphragm 48 changes as the effects of the force of gravity on passageways 45A-46B changes. For example, in the upright position shown in FIG. 3A, the head effect on sensor diaphragm 48 from each fill fluid is approximately equal; the total head effect approximately being zero.

Inclination sensor 56 cannot sense rotation perpendicular to the earth's gravitational field, that is to say parallel to the earth's horizon. Inclination sensor 56, and in particular, tri-axis accelerometers, measure inclination based on changes in the effects of gravity on the x-, y- and z-axes. For the starting orientation of FIG. 3A, inclination sensor 56 registers zero Gs (acceleration of gravity) in the x- and y-directions, but registers +1 Gs along the z-axis. With these readings set to be the reference orientation, transmitter 12 knows it is in the "upright" position.

Transmitter 12 can be rotated to other orientations for which the head effect will remain approximately zero, as is the case in FIG. 3A. However, for other various orientations of transmitter 12, the head effect changes as the imbalance of pressure on diaphragm 48 from the fill fluids increases as the gravity effects on passageways 45A-46B changes.

FIGS. 3B-3F show the transmitter of FIG. 3A moved to various orientations from the reference point. FIG. 3B shows the transmitter of FIG. 3A rotated ninety degrees about the z-axis. However, rotation about the z-axis does not affect the head effect. The head effect presented by the fill fluids in FIG. 3B remains at approximately zero since passageways 45A-46B have the same orientation with respect to earth's horizon (the x-y plane). In other words, gravity is affecting the fill fluids in passageways 45A-46A and 45B-46B equally, and inclination sensor 56 registers the same readings as for the orientation of FIG. 3A.

Figures 3D, 3E:
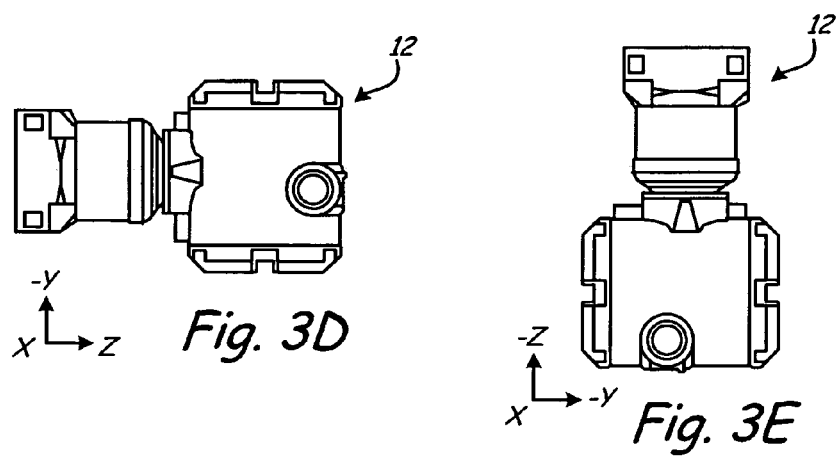

FIG. 3E shows transmitter 12 in the "upside down" orientation with respect to the starting orientation of FIG. 3A (i.e. rotated one hundred eighty degrees about the x-axis), for which the head effect is also approximately zero. For the orientation of FIG. 3E, inclination sensor 56 still registers zero Gs in the x- and y-directions, but registers −1 Gs along the z-axis, indicating that the orientation of transmitter 12 has changed, but that the head effect will nonetheless remain approximately zero. Since gravity is still affecting passageways 45A-46A and 45B-46B equally, each fill fluid is still affecting sensor 50 in an approximately equal relationship.

Similarly, zero head effect is produced by the orientation of FIG. 3C, where transmitter 12 is on its side with passageways 45A-46B both being parallel to the x-y plane. FIG. 3C shows the transmitter of FIG. 3A rotated ninety degrees about the y-axis. Thus, inclination sensor 56 registers zero Gs in the z- and y-directions, but registers 1 Gs along the x-axis. But, the 1 G acts on passageways 45A-46A and passageways 45B-46B equally, resulting in zero net head effect.

Figures 3F, 3G:
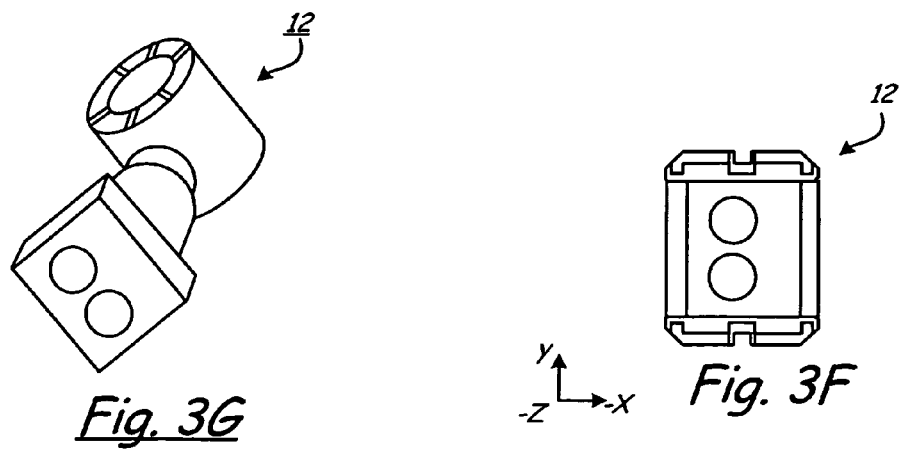

FIGS. 3D and 3F, however, show transmitter 12 also on its side, but with changes in head effect from the upright orientation in FIG. 3A. FIG. 3D shows the transmitter of FIG. 3A rotated ninety degrees about the x-axis. FIG. 3F shows the transmitter of FIG. 3A rotated ninety degrees about the x-axis and ninety degrees about the z-axis. FIGS. 3D and 3F represent the maximum disparity produced in the head effect from the fill fluids because passageways 45A-46A and 45B-46B are separated by the maximum vertical distance with respect to earth's horizon. In FIGS. 3D and 3F, transmitter 12 is on its side such that passageways 45A-46A are directly on top of sensor diaphragm 48, while passageways 45B-46B are directly beneath it. Thus, the fill fluid in passageways 45A-46A exert a force on diaphragm 48 significantly greater than any force applied to diaphragm 48 by passageways 45B-46B. Similarly, FIG. 3G shows the transmitter of FIG. 3A rotated at intermediate angles about the x-, y- and z-axes, which is just one of an infinite number of intermediate orientations of transmitter 12. In this orientation, the fill fluids of each passageway exert partial forces (between +1 and −1 Gs) on diaphragm 48 along the x-, y- and z-axes, for which circuitry 52 and inclination sensor 56 are used to compensate.

Transmitter circuitry 52 includes software routines that translate the acceleration vectors generated by inclination sensor 56 into a new orientation for transmitter 12 on the selected reference system. For each new inclination of transmitter 12, a head effect correction factor is determined. The head effect correction factor is applied to the sensor signal, at circuitry 52, to adjust for changes in the head effect influence of diaphragm 48. The head effect correction factor adjusts or calibrates circuitry 52 such that it normalizes the output of sensor 50 for changes in the head effect. The output of circuitry 52, therefore, resembles a transmitter output as if transmitter 12 had not changed inclination, and there were no head effect influence on sensor 50. The head effect correction factor can be determined by circuitry 52 in different manners. Transmitter circuitry 52 can include software routines for mathematically calculating the head effect change based on the reference orientation and the new orientation detected by inclination sensor 56. For example, transmitter circuitry 52 can include routines for taking the acceleration reading from the x-, y- and z-axes of inclination sensor 56 and producing force values for the fill fluid on diaphragm 48 for a specified density of the fill fluids. Transmitter circuitry 52 can also be provided with head effect correction factor look-up tables for selecting a correction factor from a table based on the new location point and inclination. In either case, the reference orientation provides circuitry 52 with the proper frame of reference to account for the effects of gravity in determining the head effect correction factor and how to apply it to output of sensor 50. Transmitter circuitry may also include memory for storing sensed orientations of transmitter 12 such that, for example, movement of transmitter 12 over time can be tracked.

Additionally, in other embodiments, transmitter circuitry 52 also includes stored data for calculating the head effect for different types of fill fluids that are commonly used in pressure transmitters. For example, circuitry 52 may include stored data relating to the density of different fill fluids, which affects how the head effect calibration is determined. In one embodiment, transmitter 12 includes a user menu to select between different fill fluid types or fill fluid densities. Since all transmitters in a model family are physically identical, e.g. passageways 45A-46B are the same, the same correction techniques can be used for each device without the need to test each device.

Transmitter circuitry 52 can also annunciate to a user various information regarding the calibration of process control system 10 for head effect. For example, if transmitter 12 is out of calibration, a warning message is displayed on LCD 21 or transmitted through control loop 22 to control room 20. Transmitter 12 can also indicate that circuitry 52 is processing data or that a manual reset of the calibration system is needed. A user is then alerted of the need to investigate control system 10 and transmitter 12. In other embodiments transmitter 12 includes additional annunciation components, such as an LED light or an audible alarm. Thus, because of the added capability to automatically calibrate for and warn about head effect issues, it is advantageous to include inclination sensor 56 in pressure transmitters, particularly those used in low pressure range applications. However, the ability of inclination sensor 56 to determine orientation of transmitter 12 is also beneficial in other types of process transmitters, particularly those with local displays such as LCD 21.

Figure 4:
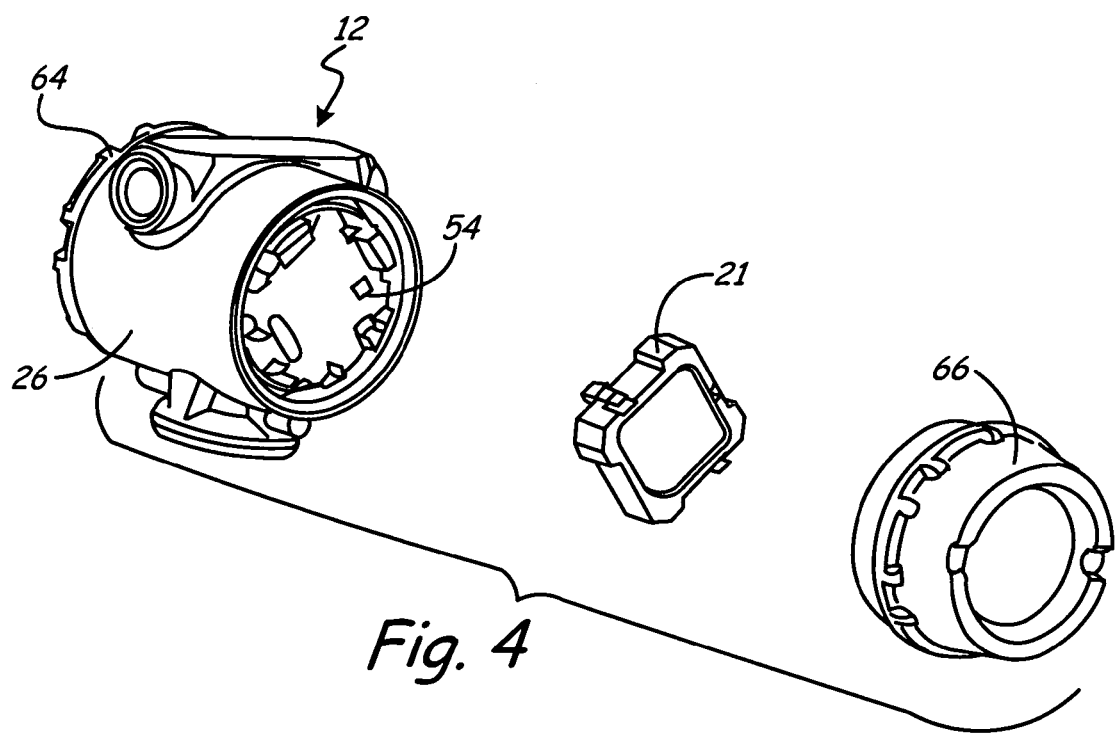
FIG. 4 is a partially exploded view of a process transmitter including an LCD display.

FIG. 4 is a partially exploded view of a process transmitter 12 including LCD 21. Transmitter housing 26 includes covers 64 and 66 for providing access to components of transmitter 12 such as LCD 21 and display bracket 54. As described in greater detail above, transmitter 12 is capable of being used in many different applications in various configurations such that it can be fit into tight places or be properly mated with mounting flanges and manifolds. It therefore becomes necessary to install transmitter 12 in various orientations. Thus, LCD 21 often becomes oriented such that its display is upside down or otherwise difficult to read by a user. In order to adjust the orientation of LCD 21, it is typically necessary to remove cover 66, unplug LCD 21 from bracket 54, and replace LCD 21 into bracket 54 in a different orientation. However, with inclination sensor 56, transmitter circuitry 52 can adjust the orientation of the display of LCD 21 based on the inclination of transmitter 12 as determined with inclination sensor 56. Circuitry 52 uses inclination determined by inclination sensor 56 to adjust the display of LCD 21 such that it will display in an upright or nearly upright orientation, making it easier for a user to read LCD 21 without the need to disassemble transmitter housing 26. Thus, transmitter 12 can be simplified by integrating LCD 21 and bracket 54 directly into circuitry 52, thereby eliminating the need to manufacture and assemble additional components. This also reduces the amount of space occupied inside transmitter housing 26, thereby providing space for the addition of other performance enhancing components to transmitter 12.

In various embodiments, transmitter circuitry 52, inclination sensor 56, LCD 21 and control loop 22 are used to obtain additional inputs for determining and annunciating additional information. For example, in one embodiment, inclination sensor 56 is used to detect mechanical vibration of transmitter 12, such as described in U.S. patent application Ser. No. 10/675,014 (Publication No. 2005/0072239) by Longsdorf et al. Vibration detection can be used to determine if transmitter 12 is loosely mounted with system 10 or if pipes 14 or 34 are vibrating excessively; i.e. inclination sensor 56 can be used to monitor relative, or localized, motion of transmitter 12, as well as absolute motion. Localized vibration data obtained from inclination sensor 56 can be checked with predetermined data stored in memory of circuitry 52 relating to stress limits of transmitter 12. Circuitry 52 can determine if the vibration is imposing an excessive amount of stress on transmitter 12 and its components such that they may become damaged. If any potential risks are determined, circuitry 52 annunciates to a user that process control system 10 needs to be checked, such as by displaying a message on LCD 21 or transmitting a warning to control room 20. Additionally, circuitry 52 and inclination sensor 56 can be configured and combined with other components for performing vibration filtering and analysis, such as is described in U.S. Pat. No. 6,601,005 by Eryurek et al.

Figure 5A:
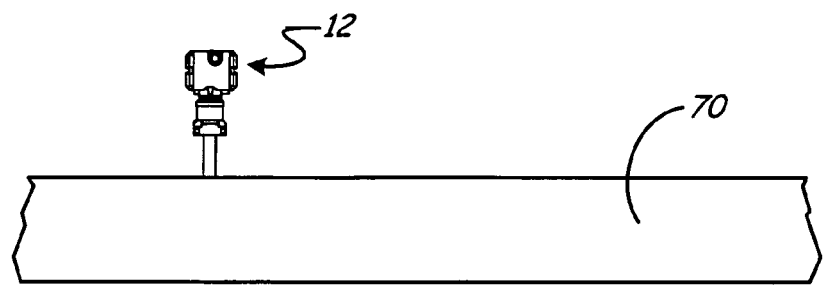
FIG. 5A shows a process transmitter of the present invention installed on a horizontal pipe.
Figure 5B:
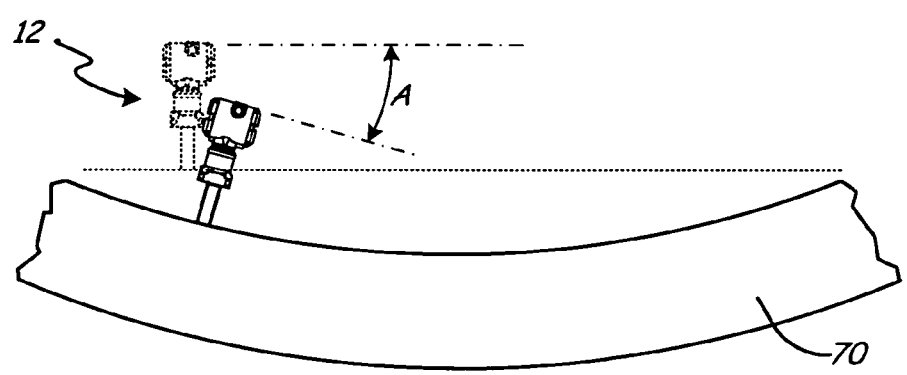
FIG. 5B shows the process transmitter of FIG. 5A after the pipe has undergone an unintended displacement.

In other embodiments, the ability of inclination sensor 56 to sense changes to orientation is used to detect a local displacement of transmitter 12. FIGS. 5A and 5B illustrate an example of a process transmitter having undergone a localized displacement. FIG. 5A shows transmitter 12 mounted on pipeline 70 such that it is in a generally horizontal orientation. In FIG. 5A, pipeline 70 is generally straight. Over time, the installation of pipeline 70 may sag due to several reasons including excessive weight placed on the pipes, broken mounts, or other damage. Additionally, transmitters are often improperly used as "steps" or platforms on which to stand, which can impart damage or undue stresses to mounting hardware or piping, which also produces a local displacement of transmitter 12. FIG. 5B shows transmitter 12 of FIG. 5A having undergone a localized displacement with a corresponding change in orientation. As can be seen, transmitter 12 has gone from a generally "upright" orientation to some inclined orientation, as is illustrated by angle A. In any event, a local displacement of transmitter 12 can be sensed by inclination sensor 56 indicating a change to the process control system and a potential hazard that needs to be inspected. Thus, inclination sensor 56 can be used as a tool to detect when preventative maintenance is necessary, often before indications are available from the process parameters themselves.

Although the present invention has been described with reference to preferred embodiments, workers skilled in the art will recognize that changes may be made in form and detail without departing from the spirit and scope of the invention.

The invention claimed is:

1. A process transmitter for measuring a process variable, the process transmitter comprising:
   a process sensor for sensing the process variable of a process;
   an inclination sensor for sensing a stationary orientation of the process transmitter;
   transmitter circuitry for producing an output based on the sensed process variable and the sensed stationary orientation; and
   an LCD screen having a display output based on the output of the circuitry, and wherein the circuitry adjusts an orientation of the display output based on the stationary orientation of the transmitter sensed by the inclination sensor.

2. The process transmitter of claim 1 wherein the inclination sensor comprises a tri-axis accelerometer for generating a three-dimensional acceleration vector.

3. The process transmitter of claim 2 wherein the transmitter circuitry determines a stationary inclination of the transmitter with respect to a reference three-dimensional coordinate system based on an output of the inclination sensor.

4. The process transmitter of claim 3 wherein the transmitter circuity determines a local three-dimensional rotational displacement of the transmitter from the stationary inclination based on the three-dimensional acceleration vector generated by the inclination sensor with respect to the three-dimensional coordinate system.

5. The process transmitter of claim 3 wherein the transmitter circuitry records transmitter orientation data.

6. The process transmitter of claim 3 wherein the transmitter circuitry is pre-programmed with a starting, three-dimensional reference position from which the stationary inclination is determined with reference to the three-dimensional coordinate system.

7. The process transmitter of claim 4 wherein the transmitter circuitry determines mechanical vibration of the transmitter based on changes in the sensed stationary orientation of the transmitter and the three-dimensional acceleration vector.

8. The process transmitter of claim 1 wherein the transmitter circuitry annunciates information relating to output of the inclination sensor.

9. The process transmitter of claim 1 and further comprising a hydraulic fill fluid for conveying the process variable to the process sensor, wherein the fill fluid produces a head effect on the process sensor based on the stationary orientation of the process transmitter wherein the transmitter circuitry calibrates the output to account for a change in head effect resulting from a change in the stationary orientation of the transmitter, wherein the calibration utilizes the stationary orientation of the transmitter sensed by the inclination sensor.

10. The process transmitter of claim 9 wherein the transmitter circuitry adjusts the calibration for fill fluids having varying properties.

11. The process transmitter of claim 9 wherein the transmitter circuitry calibrates the output based on software algorithms.

12. The process transmitter of claim 1 wherein the output comprises a process variable signal generated by the process sensor compensated with a stationary orientation signal from the inclination sensor.

13. The process transmitter of claim 12 wherein the compensated process variable signal is calibrated with respect to gravity.

14. A method for adjusting an output of a process transmitter, the method comprising:
   sensing a process variable of a process with a process sensor to produce a sensor signal;
   sensing a stationary orientation of the process transmitter with an inclination sensor to produce an orientation signal;
   conveying the process variable to the process sensor with hydraulic fill fluid, wherein the fill fluid produces a head effect on the process sensor based on the stationary orientation of the process transmitter wherein the transmitter circuitry calibrates the output to account for a change in head effect resulting from a change in the stationary orientation of the transmitter, wherein the calibration utilizes the stationary orientation of the transmitter sensed by the inclination sensor; and
   producing an adjusted transmitter output with transmitter electronics, the transmitter output being based on the sensor signal and the orientation signal.

15. The method of claim 14 wherein the adjusted transmitter output comprises a local display output.

16. The method of claim 14 wherein the adjusted transmitter output comprises a process variable magnitude.

17. The method of claim 16 wherein the step of producing an adjusted transmitter output comprises calibrating the sensor signal due to a change in head effect on the process sensor based on a change in orientation of the transmitter.

18. The method of claim 16 wherein the step of producing an adjusted transmitter output further comprises adjusting the adjusted transmitter output for fill fluid properties.

19. The method of claim 17 wherein producing an adjusted transmitter output is further based on software algorithms.

20. A process transmitter for measuring a process variable, the process transmitter comprising:

a process sensor for sensing the process variable of a process;

an inclination sensor for sensing an orientation of the process transmitter;

a hydraulic fill fluid for conveying the process variable to the process sensor, wherein the fill fluid produces a head effect on the process sensor based on the orientation of the process transmitter;

transmitter circuitry for producing an output based on the sensed process variable and the sensed orientation, wherein the transmitter circuitry calibrates the output to account for a change in head effect resulting from a change in the orientation of the transmitter, wherein the calibration utilizes the orientation of the transmitter sensed by the inclination sensor.

21. The process transmitter of claim 20 wherein the circuitry adjusts its output based on an original orientation of the transmitter as compared with a current orientation of the transmitter determined by the inclination sensor.

22. The process transmitter of claim 20 and further comprising an LCD screen having a display based on output of the circuitry, and wherein the circuitry adjusts the display based on the orientation signal.

23. The process transmitter of claim 20 wherein the inclination sensor is a tri-axis accelerometer.

24. The process transmitter of claim 20 wherein the transmitter circuitry records the sensed orientation of the transmitter.

25. The process transmitter of claim 20 wherein the transmitter circuitry annunciates that calibration of the head effect has changed.

26. The process transmitter of claim 20 wherein the transmitter circuitry determines an inclination of the transmitter based on output of the inclination sensor.

27. The process transmitter of claim 26 wherein the transmitter circuitry determines a local displacement of the transmitter based on the inclination signal.

28. The process transmitter of claim 20 wherein the transmitter circuitry is adjustable for fill fluids having varying properties.

29. The process transmitter of claim 20 wherein the transmitter circuitry performs vibration filtering based on the inclination signal.

* * * * *